(12) United States Patent
Zhu et al.

(10) Patent No.: US 11,528,651 B2
(45) Date of Patent: Dec. 13, 2022

(54) SYSTEMS AND METHODS FOR PRIORITIZING USER EQUIPMENT ACCESS TO FIFTH GENERATION (5G) ULTRA-WIDEBAND NETWORKS AND WIRELESS NETWORKS

(71) Applicant: Verizon Patent and Licensing Inc., Arlington, VA (US)

(72) Inventors: Lily Zhu, Parsippany, NJ (US); Samirkumar Patel, Middlesex, NJ (US); Deepa Jagannatha, Bridgewater, NJ (US); Balaji L. Raghavachari, Bridgewater, NJ (US); Brian T. Mecum, Ladera Ranch, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 146 days.

(21) Appl. No.: 16/825,408

(22) Filed: Mar. 20, 2020

(65) Prior Publication Data

US 2021/0297919 A1    Sep. 23, 2021

(51) Int. Cl.
*H04W 36/30* (2009.01)
*H04W 48/16* (2009.01)
*H04B 17/309* (2015.01)
*H04W 36/36* (2009.01)
*H04W 36/16* (2009.01)

(52) U.S. Cl.
CPC .......... *H04W 36/30* (2013.01); *H04B 17/309* (2015.01); *H04W 36/165* (2013.01); *H04W 36/36* (2013.01); *H04W 48/16* (2013.01)

(58) Field of Classification Search
CPC ..... H04W 36/30; H04W 48/16; H04W 36/36; H04W 36/165; H04B 17/309
See application file for complete search history.

(56) References Cited

U.S. PATENT DOCUMENTS

| 10,085,198 | B2 * | 9/2018 | Kavoussi | H04M 15/00 |
| 10,602,417 | B2 * | 3/2020 | Vemuri | H04W 36/0022 |
| 2017/0208488 | A1 * | 7/2017 | Hwang | H04W 76/30 |
| 2021/0204175 | A1 * | 7/2021 | Rangaraju | H04W 36/00837 |
| 2021/0274416 | A1 * | 9/2021 | Jendli | H04W 36/00837 |

* cited by examiner

*Primary Examiner* — Jaime M Holliday

(57) ABSTRACT

A user equipment (UE) may establish a wireless connection with a WiFi network, and may perform a measurement associated with a fifth generation (5G) ultra-wideband radio access network. The UE may determine whether the measurement satisfies a signal strength threshold, and may selectively perform a first action or a second action based on whether the measurement satisfies the signal strength threshold. The first action may include providing an indication of an availability of the 5G ultra-wideband radio access network, for display, when the measurement satisfies the signal strength threshold. The second action may include maintaining the wireless connection when the measurement fails to satisfy the signal strength threshold.

20 Claims, 13 Drawing Sheets

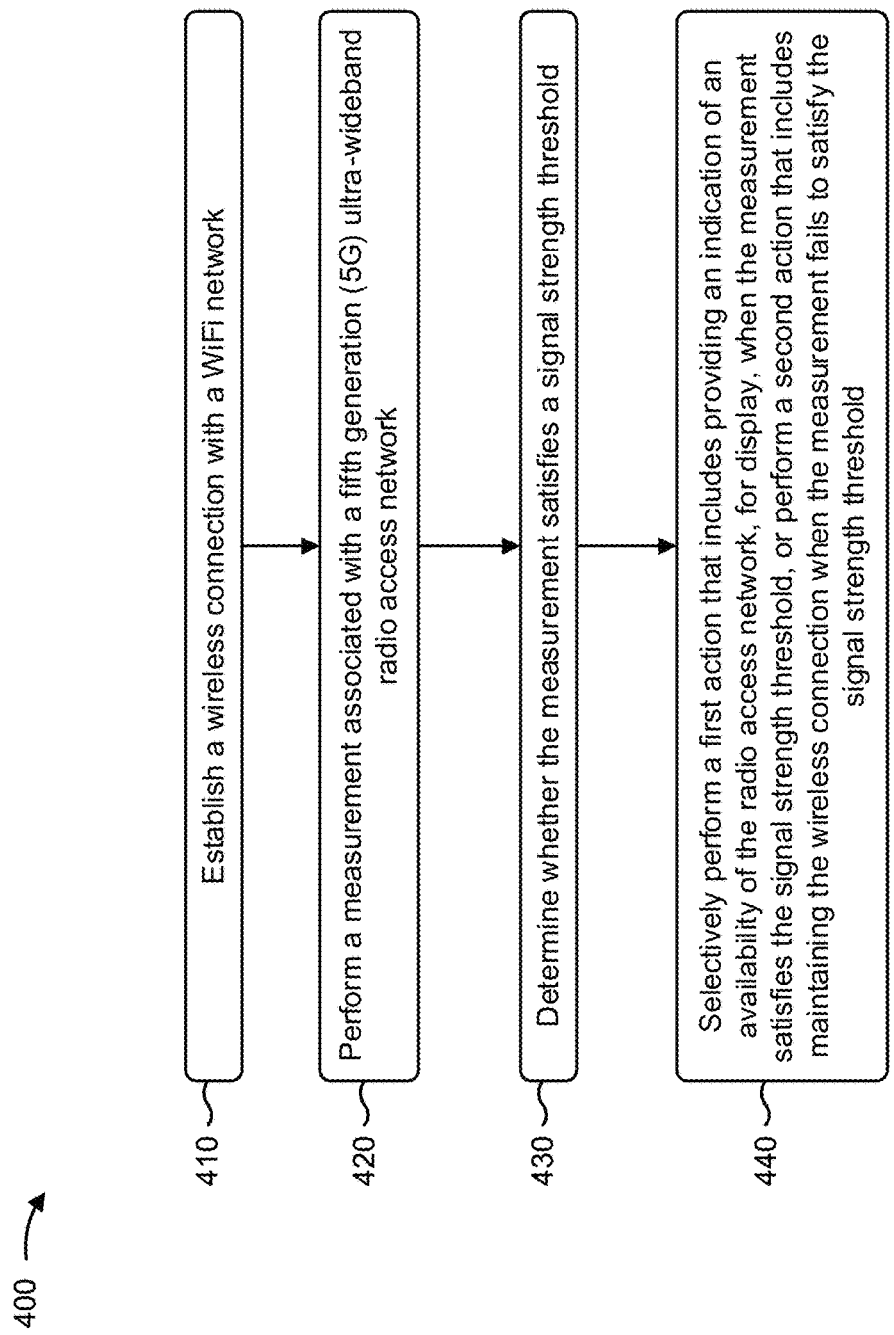

US 11,528,651 B2

SYSTEMS AND METHODS FOR PRIORITIZING USER EQUIPMENT ACCESS TO FIFTH GENERATION (5G) ULTRA-WIDEBAND NETWORKS AND WIRELESS NETWORKS

BACKGROUND

Fifth generation (5G) user equipment (UEs) in densely populated areas (e.g., venues, cities, and/or the like) may attain very large uplink and downlink speeds when operating in 5G coverage.

BRIEF DESCRIPTION OF THE DRAWINGS

FIG. 4 is a flow chart of an example process for prioritizing user equipment access to fifth generation (5G) ultra-wideband networks and wireless networks.

DETAILED DESCRIPTION OF PREFERRED EMBODIMENTS

Figure 1A:
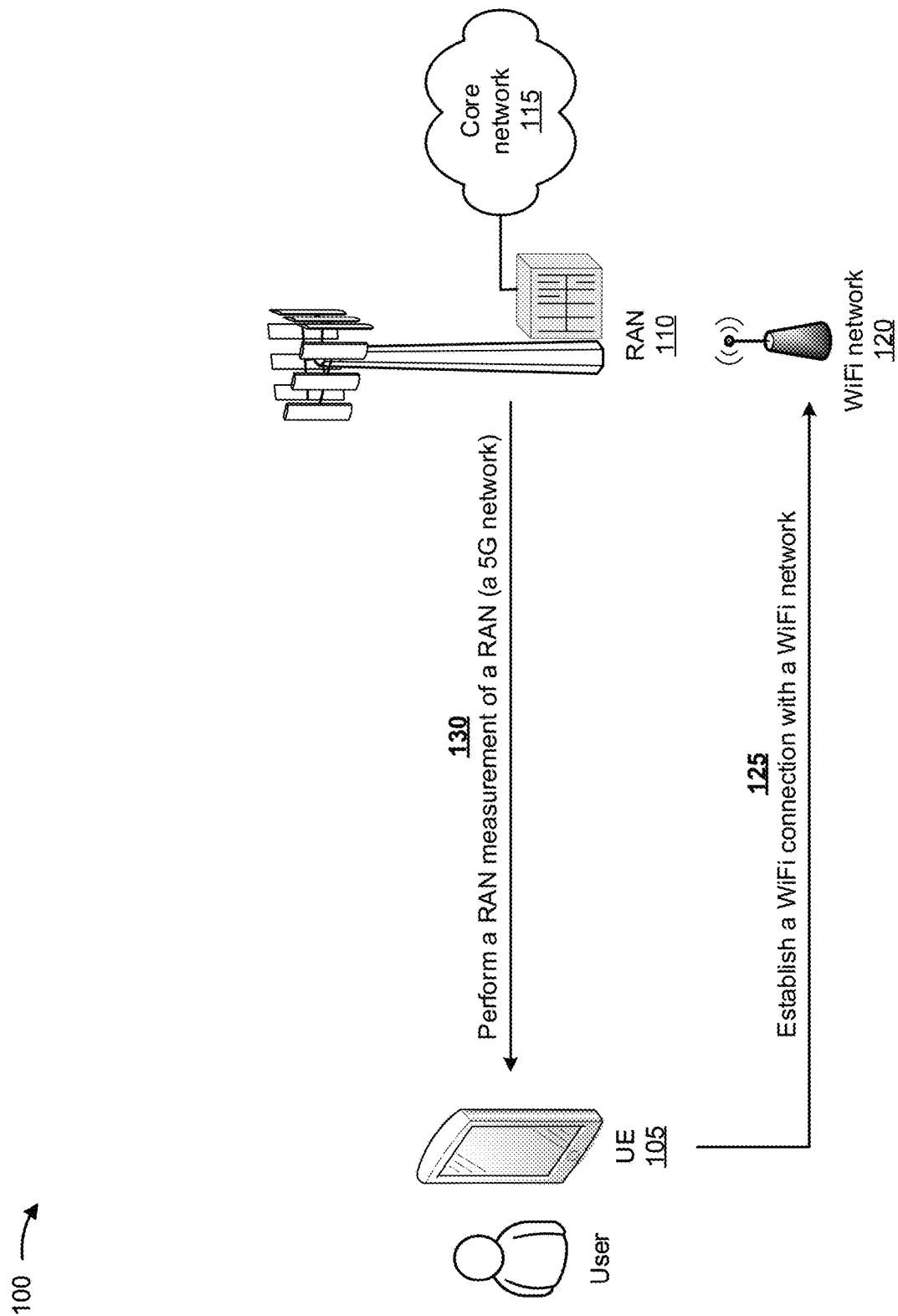
FIGS. 1A-1J are diagrams of one or more example implementations described herein.

The following detailed description of example implementations refers to the accompanying drawings. The same reference numbers in different drawings may identify the same or similar elements.

Current UEs, by default, may provide all data traffic over a Wi-Fi network for the purpose of cellular offload to WiFi to maximize fourth generation (4G) long-term evolution (LTE) capacity for real needs. However, in an environment where every UE is using a Wi-Fi network, data traffic may be congested since there is a limited bandwidth on the Wi-Fi network, even while abundant bandwidth from a fifth generation (5G) ultra-wideband network (e.g., mmWave network between thirty gigahertz (GHz) and three-hundred GHz) goes unutilized. In addition, any services that are specific to 5G ultra-wideband network will not be available to the user when Internet traffic automatically connects to WiFi. Since UEs may prioritize Wi-Fi over 5G for data traffic, users of the UEs may be prevented from accessing the speed and new services associated with a 5G ultra-wideband network. Thus, current UEs WiFi offloading behavior may inefficiently utilize and waste computing resources (e.g., processing resources, memory resources, communication resources, and/or the like), networking resources, and/or the like by incorrectly routing traffic to Wi-Fi networks, overloading Wi-Fi networks, not enabling discovery and routing of traffic to a 5G ultra-wideband network with abundant resources and additional services, and/or the like.

Some implementations described herein provide a UE that prioritizes access to a 5G ultra-wideband network and a wireless network (e.g., a Wi-Fi network). For example, while the UE is using WiFi for Internet traffic, the UE may establish a wireless connection with a 5G ultra-wideband network (in a sub 6 GHz spectrum to save battery power), and may perform a measurement associated with the 5G ultra-wideband radio access network. The UE may determine whether the measurement satisfies a signal strength threshold, and may selectively perform a first action or a second action based on whether the measurement satisfies the signal strength threshold. The first action may result from detecting 5G ultra-wideband availability, and may include providing an indication of an availability of the 5G ultra-wideband radio access network, for display, when the measurement satisfies the signal strength threshold or automatically switching to the 5G ultra-wideband network (e.g., based on prior authorization). The second action may include maintaining the wireless connection when the measurement fails to satisfy the signal strength threshold.

In this way, the UE switches to 5G ultra-wideband networks that provide a required signal strength, throughput, latency, and/or the like. Thus, the UE best utilizes available computing resources, networking resources, and/or the like that would otherwise be inefficiently utilized and wasted incorrectly routing traffic to Wi-Fi networks, overloading Wi-Fi networks, not enabling discovery and routing of traffic to a 5G ultra-wideband network, and/or the like.

FIGS. 1A-1J are diagrams of one or more example implementations 100 described herein. As shown in FIG. 1A, a user equipment (UE) 105 (e.g., a mobile phone, a computer, and/or the like) may be associated with a 5G ultra-wideband radio access network (RAN) 110, a core network 115, and a WiFi network 120. RAN 110 may include one or more network devices (e.g., eNodeBs, gNodeBs, and/or the like) that provide access to core network 115. Core network 115 may include an example architecture of a 4G core network, a 5G core network included in a 5G wireless telecommunications system, and/or the like. WiFi network 120 may include a device that generates a local area network (LAN) to which the UE 105 may connect through a wireless standard, such as Wi-Fi, BLUETOOTH, and/or the like.

As further shown in FIG. 1A, and by reference number 125, UE 105 may establish a WiFi connection with a WiFi network 120. For example, UE 105 may establish a Wi-Fi connection with WiFi network 120 so that UE 105 may transmit data to and/or receive data from a network (e.g., the Internet) when Wi-Fi is available for offload to UE 105. In some implementations, UE 105 may establish the WiFi connection to conserve battery resources associated with UE 105, to limit data charges associated with cellular data connections, and/or the like.

As further shown in FIG. 1A, and by reference number 130, UE 105 may perform a RAN measurement of RAN 110 (e.g., a 5G ultra-wideband network). In some implementations, UE 105 may perform a RAN measurement of RAN 110 by utilizing third generation partnership project (3GPP)-based standard UE measurement procedures (e.g., for measuring a 5G signal). UE 105 may connect to RAN 110 as an anchor and may perform the RAN measurement from RAN 110.

In some implementations, UE 105 may periodically connect to RAN 110 (e.g., about every 1 minute, about every 5 minutes, and/or the like) and may periodically perform the RAN measurement. A frequency of the periodic connections may be configurable by a user of UE 105 and/or automatically by UE 105 (e.g., to conserve battery power of UE 105). In some implementations, UE 105 may periodically establish a connection with RAN 110 so that RAN 110 may perform a measurement (e.g., an LTE bandwidth one (B1) measurement) of a signal strength of RAN 110 with respect to UE 105. The LTE B1 measurement may be triggered when a metric associated with a neighboring inter-system cell satisfies a particular threshold associated with the metric. In this case, performing the LTE B1 measurement may cause RAN 110 to measure a metric (e.g., a signal strength)

associated with a 5G signal generated by RAN 110, and to compare the metric to the particular threshold.

Figure 1B:
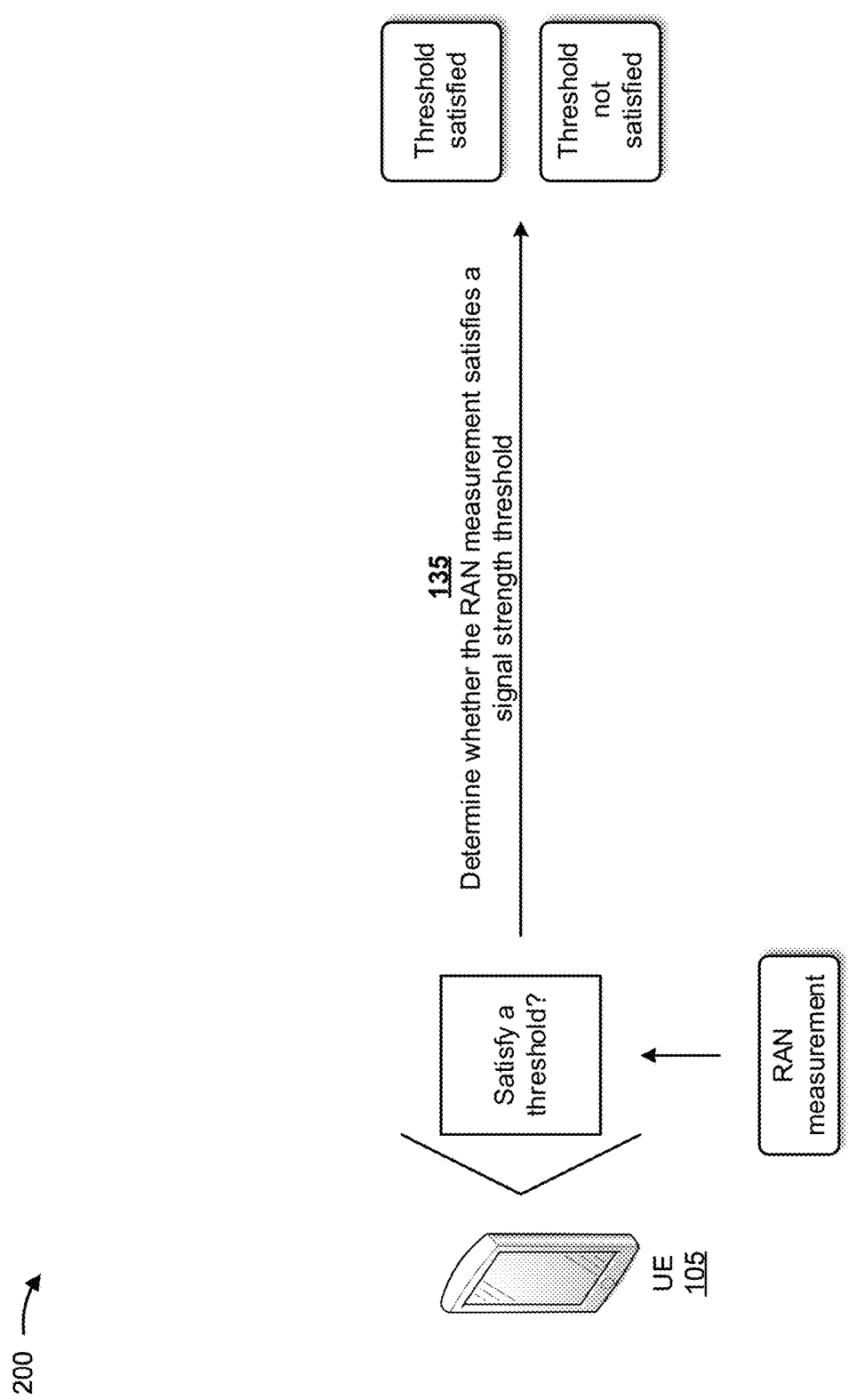

As shown in FIG. 1B, and by reference number 135, UE 105 may determine whether the RAN measurement satisfies a signal strength threshold. In some implementations, the RAN measurement may be a reference signal received power (RSRP) measurement. In such implementations, where the RAN measurement is an RSRP measurement of a 5G signal, UE 105 may determine whether the RAN measurement satisfies a 5G threshold, such as an evolved-UMTS terrestrial radio access network (E-UTRAN) new radio-dual connectivity (EN-DC) add threshold, a new radio-dual connectivity (NR-DC) add threshold, a new radio-carrier aggregation (NR-CA) add threshold, and/or the like. If UE 105 determines that the RAN measurement satisfies the signal strength threshold, UE 105 may determine that RAN 110 is available to UE 105. If UE 105 determines that the RAN measurement fails to satisfy the signal strength threshold, UE 105 may determine that RAN 110 is not available to UE 105.

Figure 1C:
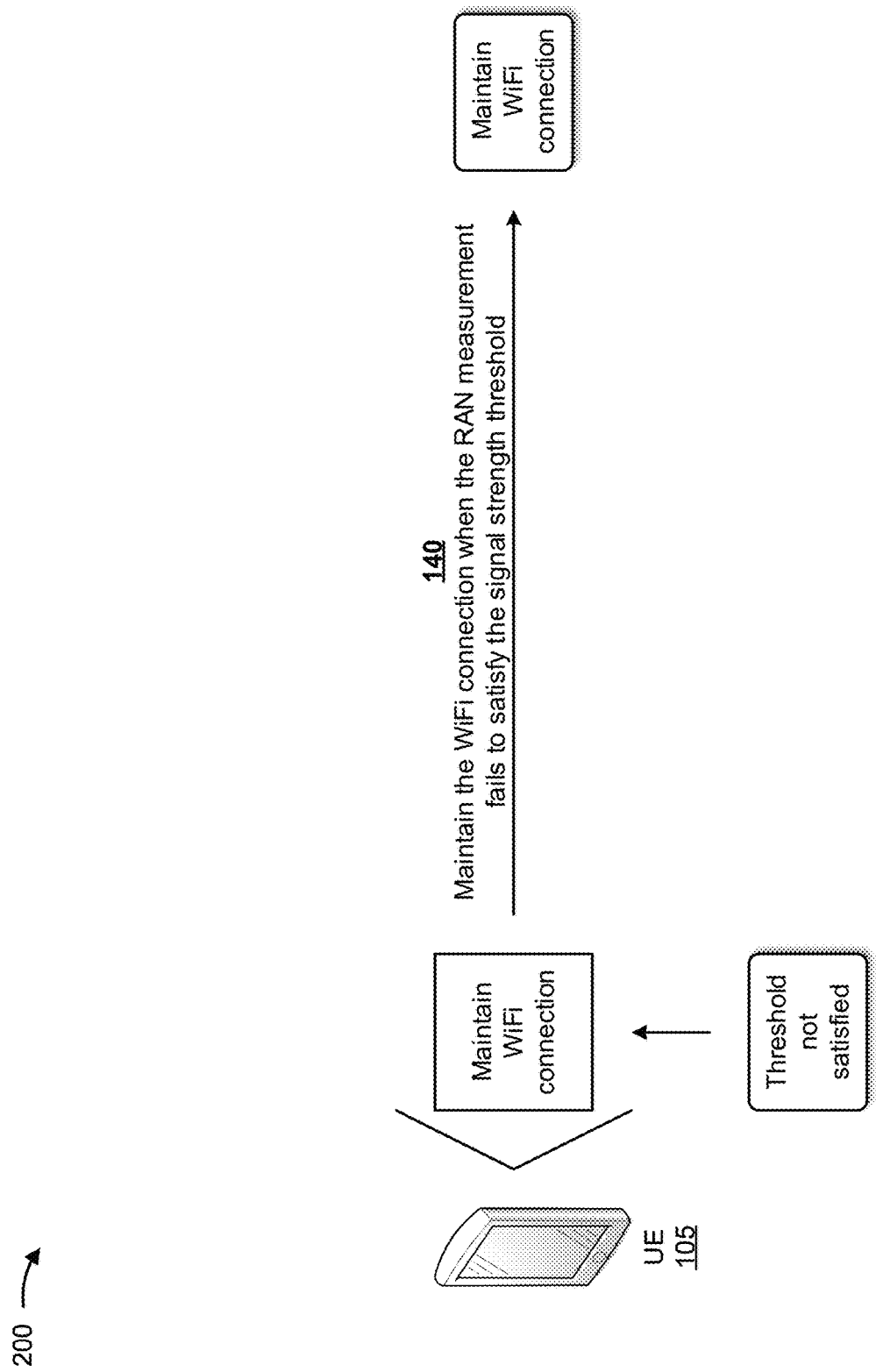

As shown in FIG. 1C, and by reference number 140, UE 105 may maintain the WiFi connection when the RAN measurement fails to satisfy the signal strength threshold. For example, since the RAN measurement fails to satisfy the signal strength threshold, UE 105 may determine that RAN 110 is unavailable. Thus, UE 105 may remain connected to the WiFi network in order to conserve battery life of UE 105, to limit data charges associated with cellular data connections, and/or the like. In some implementations, while maintaining the WiFi connection, UE 105 may periodically perform additional measurements associated with RAN 110 and may compare the additional measurements with the signal strength threshold.

Figure 1D:
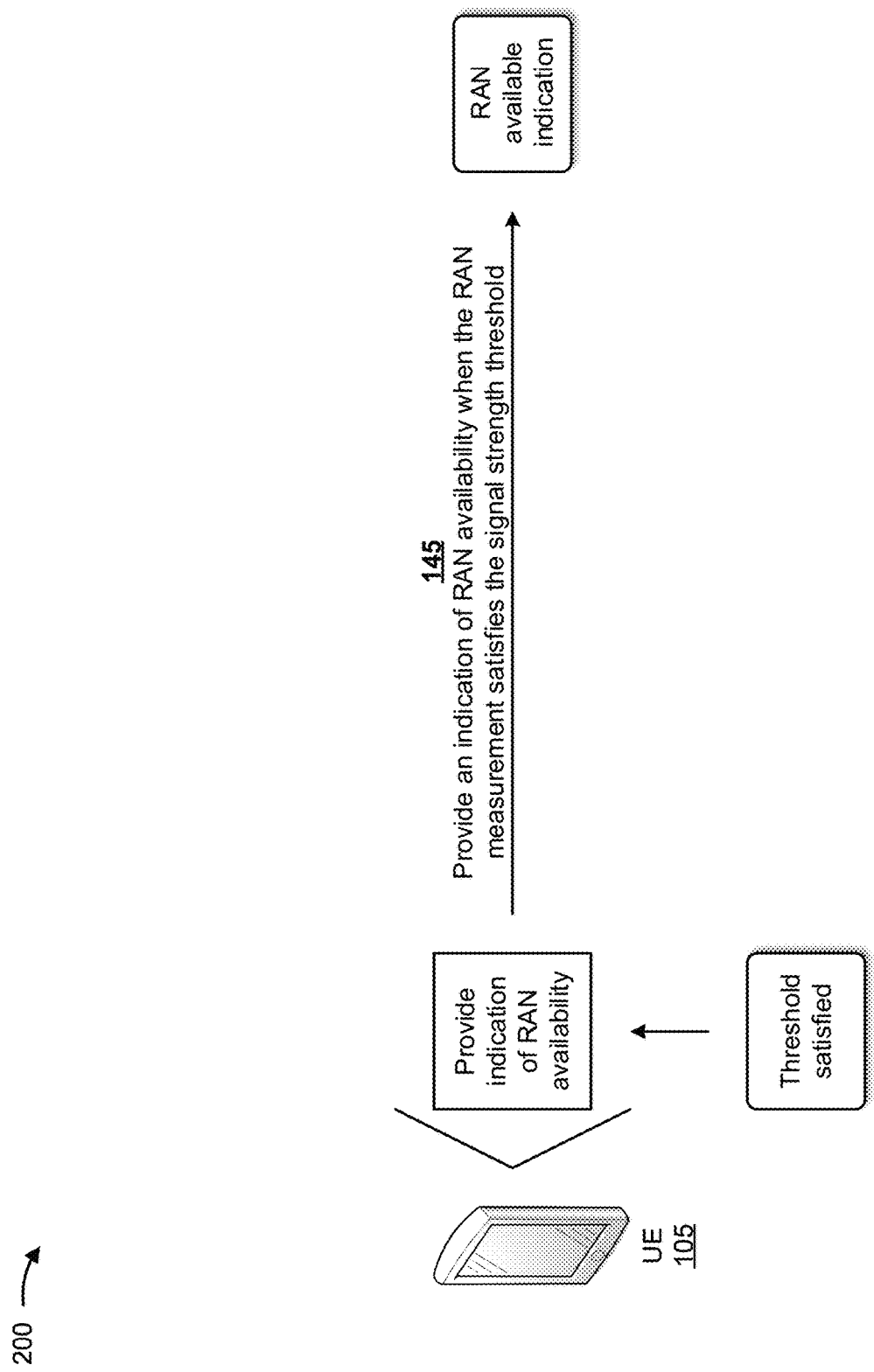

As shown in FIG. 1D, and by reference number 145, UE 105 may provide an indication of RAN 110 availability when the RAN measurement satisfies the signal strength threshold. For example, UE 105 may provide the indication of RAN availability to a user of UE 105 via a user interface. In some implementations, the user interface may include information requesting the user to choose whether to utilize a 5G connection (e.g., via RAN 110) or to continue utilizing the WiFi connection (e.g., via WiFi network 120). In some implementations, the user interface may include additional information that enables the user to make an informed decision regarding selection of the 5G connection or the WiFi connection. For example, the user interface may include information identifying signal qualities, data transfer speeds, and/or the like associated with the 5G connection and/or the WiFi connection, potential battery utilization that may result from using the 5G connection versus the WiFi connection, and/or the like.

Figure 1E:
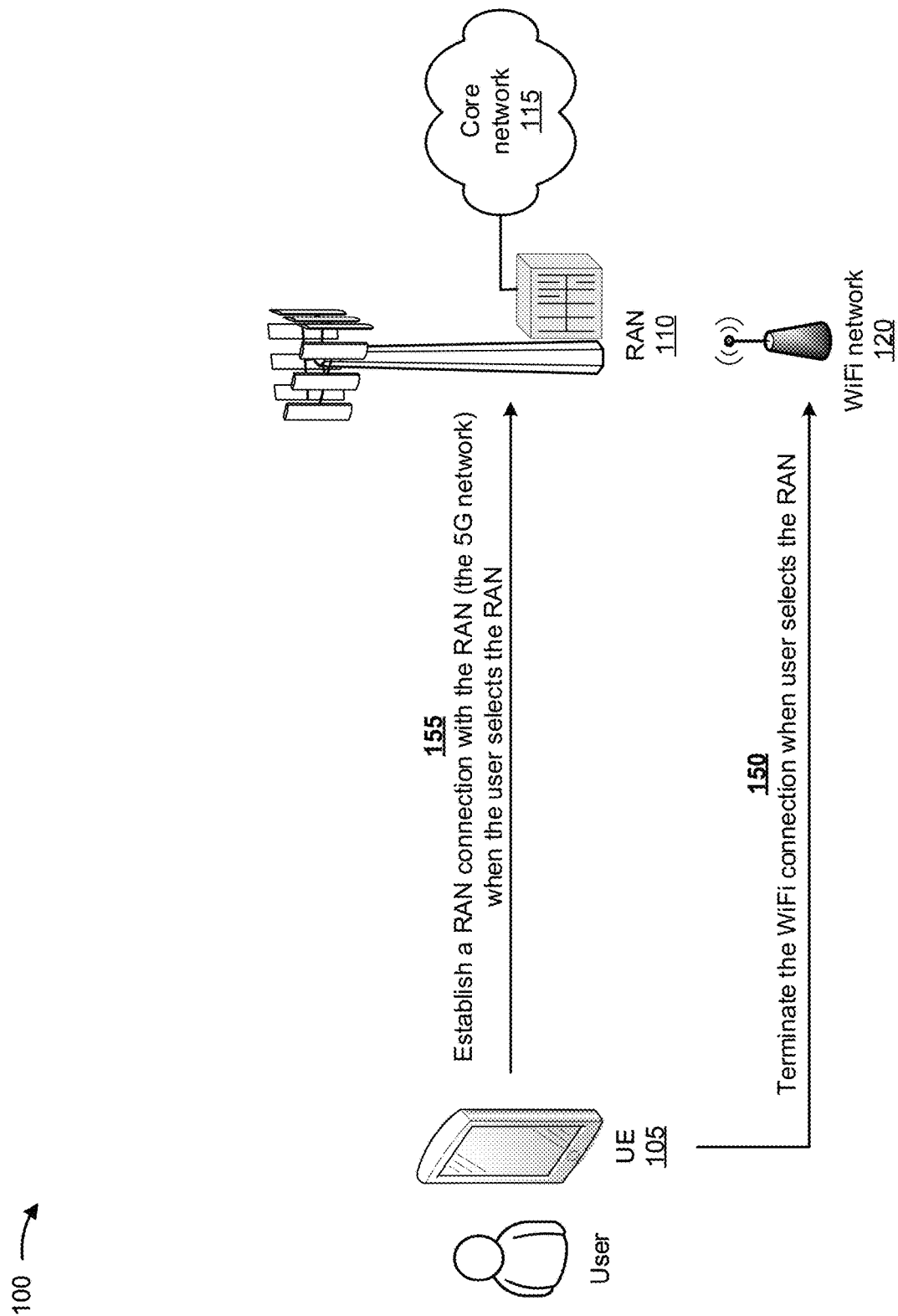

As shown in FIG. 1E, and by reference number 150, UE 105 may terminate the WiFi connection (e.g., with WiFi network 120) when the user elects to utilize RAN 110 (e.g., the 5G ultra-wideband network). In some implementations, UE 105 may terminate the WiFi connection by disconnecting from WiFi network 120, by disabling Wi-Fi connectivity of UE 105, and/or the like.

As further shown in FIG. 1E, and by reference number 155, UE 105 may establish a RAN connection with RAN 110 when the user elects to utilize RAN 110 (e.g., the 5G ultra-wideband network). In some implementations, UE 105 may utilize the RAN connection, that was previously established for performing the RAN measurement (e.g., as described above in connection with FIG. 1A), as the RAN connection with RAN 110. In some implementations, if UE 105 continues to utilize the previously-established RAN connection for performing RAN measurements, UE 105 may establish another RAN connection in parallel with the previously-established RAN connection. Thereafter, UE 105 may receive data from and/or transmit data to a data network (e.g., the Internet) via the RAN connection rather than the wireless connection.

Figure 1F:
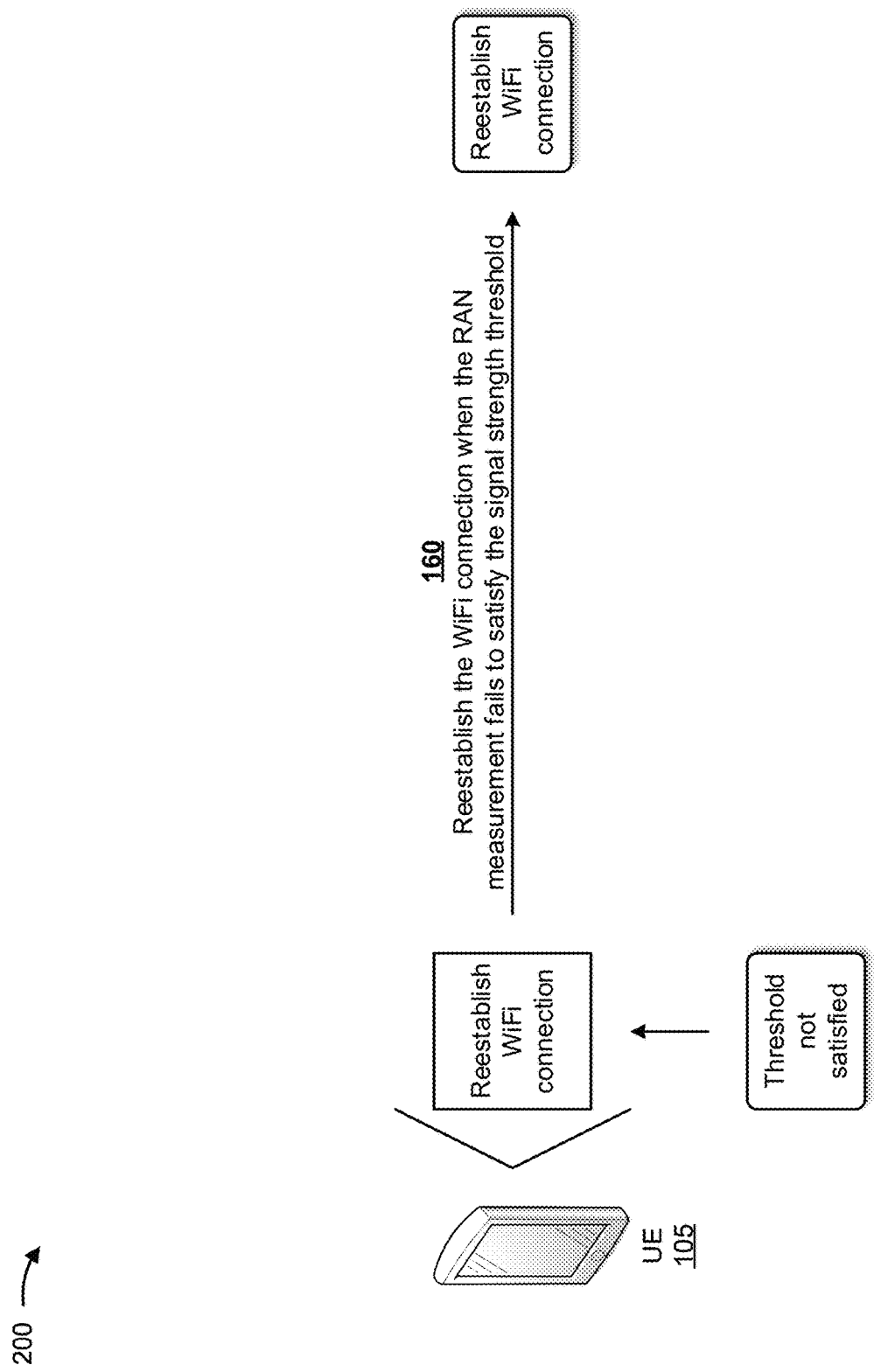

As shown in FIG. 1F, and by reference number 160, UE 105 may reestablish the WiFi connection when the RAN measurement fails to satisfy the signal strength threshold. In some implementations, UE 105 may perform another RAN measurement associated with RAN 110 after establishing the RAN connection with RAN 110, and may determine that the other RAN measurement fails to satisfy the signal strength threshold. UE 105 may terminate the RAN connection with RAN 110 based on determining that the other RAN measurement fails to satisfy the signal strength threshold, and may reestablish the WiFi connection with WiFi network 120 based on determining that the other RAN measurement fails to satisfy the signal strength threshold. In some implementations, UE 105 may reestablish the WiFi connection when battery power of UE 105 does not satisfy a threshold. For example, if the battery power of UE 105 decreases below a particular threshold power level, UE 105 may automatically terminate the RAN connection with RAN 110, and may reestablish the WiFi connection with WiFi network 120. Alternatively, UE 105 may provide, to the user of UE 105, a notification indicating that the user should switch to the WiFi connection due to a low battery power level. The user may then cause UE 105 to terminate the RAN connection with RAN 110, and reestablish the WiFi connection with WiFi network 120.

Figure 1G:
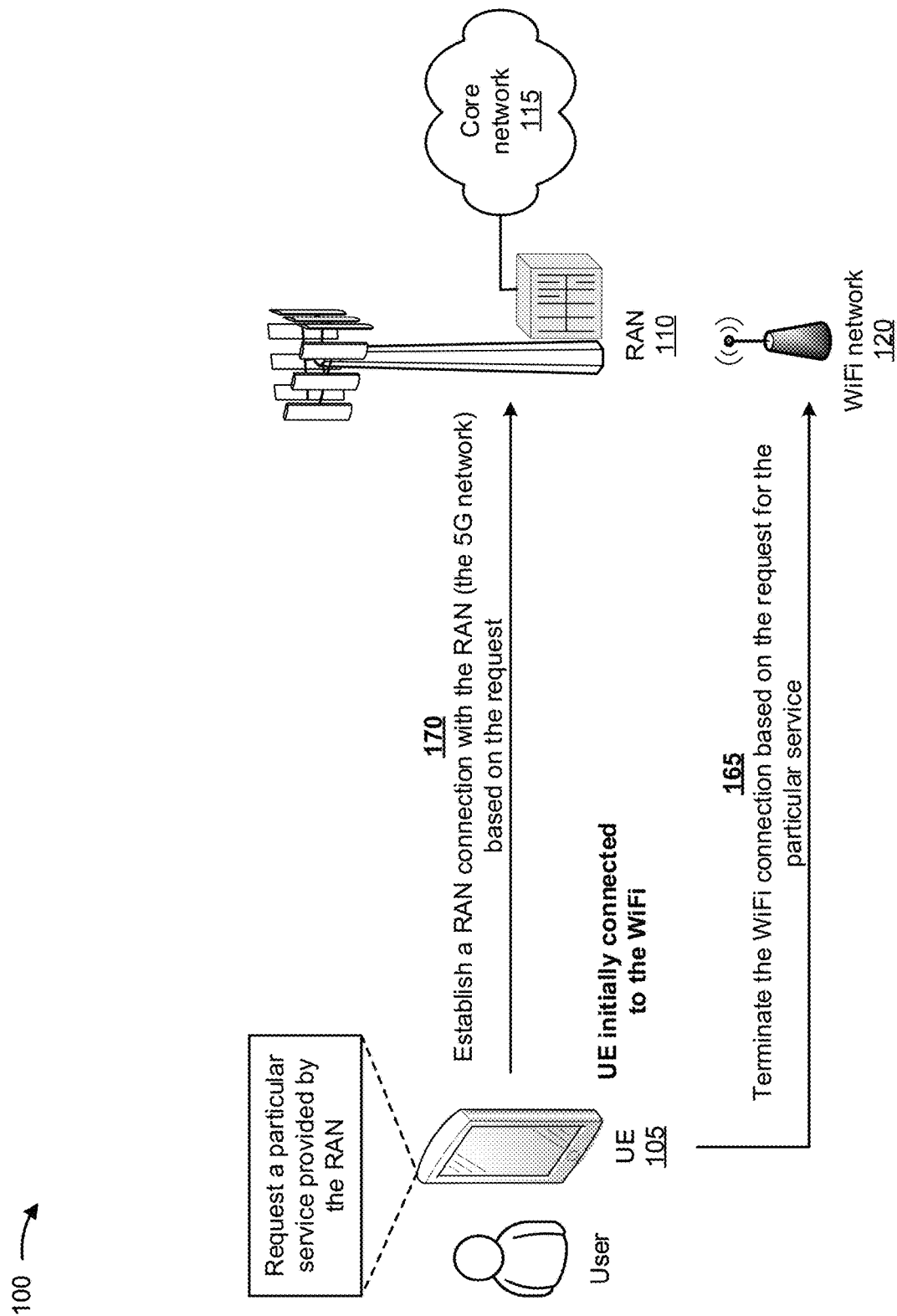

As shown in FIG. 1G, the user of UE 105 may utilize UE 105 to request a particular service provided by RAN 110 and/or core network 115. In some implementations, the particular service may include a 5G service that is best provided by RAN 110 and/or core network 115, such as an augmented reality service, a virtual reality service, a video upload service, and/or the like.

As further shown in FIG. 1G, and by reference number 165, UE 105 may terminate the WiFi connection based on the request for a particular service. In some implementations, the user may cause UE 105 to request the particular service provided by RAN 110 while UE 105 is connected to WiFi network 120, and UE 105 may terminate the WiFi connection based on the request. For example, the user may access a video upload application provided by UE 105 and associated with a video upload service offered by core network 115. Since the video upload service is offered by core network 115, UE 105 may terminate the WiFi connection in order to connect to core network 115 via RAN 110. Alternatively, UE 105 may utilize the WiFi connection to access the video upload service from core network 115, but the WiFi connection may not provide the video upload service as efficiently as RAN 110 (e.g., the video uploads may be delayed).

As further shown in FIG. 1G, and by reference number 170, UE 105 may establish a RAN connection with RAN 110 based on the request. In some implementations, UE 105 may use a specific access point name (APN) to route traffic (e.g., the request for the particular service), via the RAN connection, to RAN 110. For example, UE 105 may be pre-configured with network rules that instruct UE 105 to utilize the specific APN for the particular service. In some implementations, applications of UE 105 that utilize the particular service may be digitally signed for access control in RAN 110. When an application that utilizes the particular service satisfies a network rule defined for the particular service, and the application starts to use a wireless connection, the network rule may instruct UE 105 to route traffic (e.g., the request for the particular service) to the specific APN, via an LTE attach procedure, a 5G registration and packet data unit (PDU) session establishment request message to the specific APN, and/or the like.

Figure 1H:
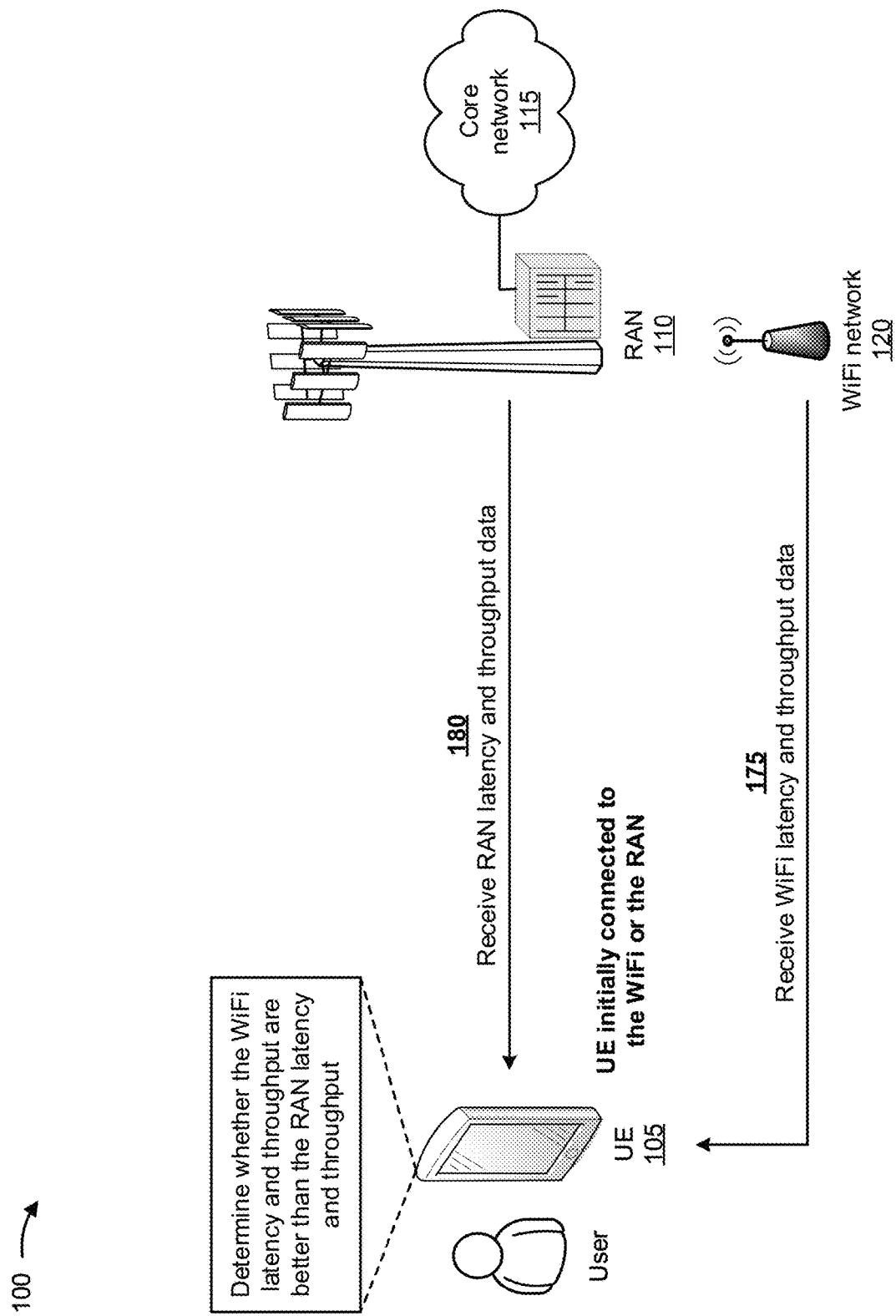

As shown in FIG. 1H, and by reference number 175, UE 105 may receive WiFi latency data and WiFi throughput data from WiFi network 120. The WiFi latency data may include data identifying delays associated with WiFi network 120, the WiFi connection, and/or the WiFi network. The WiFi throughput data may include data identifying a quantity of data transferred from WiFi network 120, the WiFi connection, and/or WiFi network 120 at a particular time. In some implementations, UE 105 may periodically receive the WiFi latency data and/or the WiFi throughput data, may continuously receive the WiFi latency data and/or the WiFi throughput data, may receive the WiFi latency data and/or the WiFi throughput data based on a request, and/or the like. UE 105 may store the WiFi latency data and the WiFi throughput data in a data structure (e.g., a database, a table, a list, and/or the like) associated with UE 105. In some implementations, UE 105 may periodically monitor a wireless signal associated with WiFi network 120, and may determine signal-to-noise ratio (SNR) and a received signal strength indicator (RSSI) for the wireless signal. In some implementations, UE 105 may provide ping commands to WiFi network 120 to determine the WiFi latency data and the WiFi throughput data associated WiFi network 120.

In some implementations, UE 105 may determine other metrics, key performance indicators, and/or the like, for the wireless signal. UE 105 may determine whether to establish and/or terminate a WiFi connection based on the other metrics, key performance indicators, and/or the like, as described below.

As further shown in FIG. 1H, and by reference number 180, UE 105 may receive RAN latency data and RAN throughput data from RAN 110. The RAN latency data may include data identifying delays associated with RAN 110 and/or the RAN connection. The RAN throughput data may include data identifying a quantity of data transferred from RAN 110 and/or the RAN connection at a particular time. In some implementations, UE 105 may periodically receive the RAN latency data and/or the RAN throughput data, may continuously receive the RAN latency data and/or the RAN throughput data, may receive the RAN latency data and/or the RAN throughput data based on a request, and/or the like. UE 105 may store the RAN latency data and the RAN throughput data in a data structure (e.g., a database, a table, a list, and/or the like) associated with UE 105. In some implementations, UE 105 may provide ping commands to RAN 110 to determine the RAN latency data and the RAN throughput data associated with RAN 110.

In some implementations, UE 105 may periodically monitor a RAN signal associated with RAN 110, and may determine an SNR and a reference signal received power (RSRP) for the RAN signal. Additionally, or alternatively, UE 105 may determine other metrics, key performance indicators, and/or the like, for the RAN signal. In some implementations, UE 105 may determine whether to establish and/or terminate a RAN connection based on the other metrics, key performance indicators, and/or the like, as described below.

As further shown in FIG. 1H, UE 105 may then determine whether the WiFi latency data and WiFi throughput data are better than the RAN latency data and RAN throughput data. In some implementations, if the WiFi latency data is better than the RAN latency data (e.g., the WiFi latency is less than the RAN latency) and the WiFi throughput data is better than the RAN throughput data (e.g., the WiFi throughput is greater than the RAN throughput), UE 105 may determine that the WiFi latency data and WiFi throughput data are better than the RAN latency data and RAN throughput data. Alternatively, if the WiFi latency data is not better than the RAN latency data (e.g., the WiFi latency is more than the RAN latency) or the WiFi throughput data is not better than the RAN throughput data (e.g., the WiFi throughput is less than the RAN throughput), UE 105 may determine that the WiFi latency data and WiFi throughput data are not better than the RAN latency data and RAN throughput data.

In some implementations, if the SNR for the wireless signal is better than the SNR for the RAN signal (e.g., the SNR for the wireless signal is greater than the SNR for the RAN signal) and the RSSI for the wireless signal is better than the RSRP for the RAN signal (e.g., the RSSI for the wireless signal is greater than the RSRP for the RAN signal), UE 105 may determine that the WiFi latency data and WiFi throughput data are better than the RAN latency data and RAN throughput data. Alternatively, if the SNR for the wireless signal is not better than the SNR for the RAN signal (e.g., the SNR for the wireless signal is less than the SNR for the RAN signal) and the RSSI for the wireless signal is better than the RSRP for the RAN signal (e.g., the RSSI for the wireless signal is less than the RSRP for the RAN signal), UE 105 may determine that the WiFi latency data and WiFi throughput data are not better than the RAN latency data and RAN throughput data.

Figure 1I:
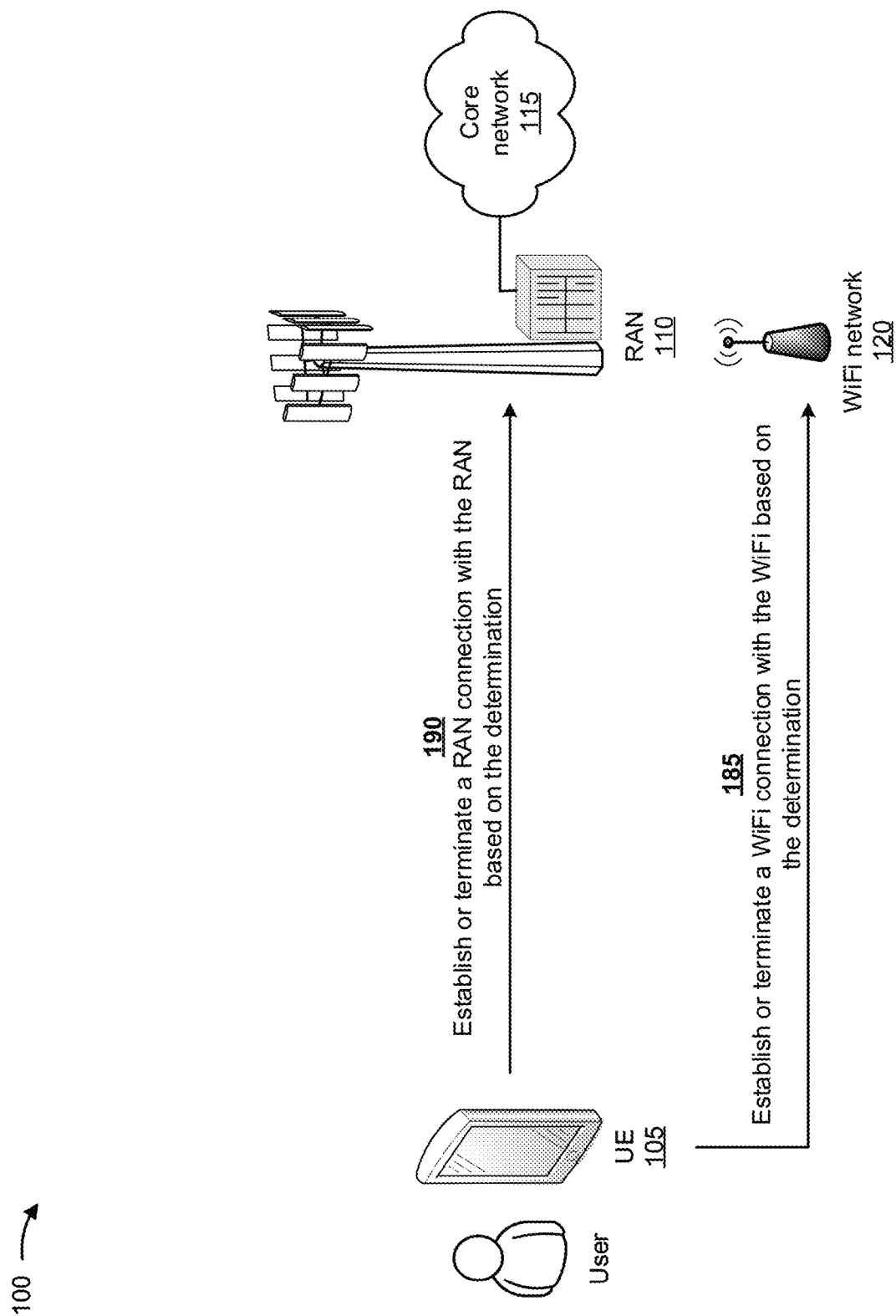

As shown in FIG. 1I, and by reference number 185, UE 105 may establish or terminate a WiFi connection with WiFi network 120 based on determining whether the WiFi latency data and WiFi throughput data are better than the RAN latency data and RAN throughput data. For example, UE 105 may establish the WiFi connection with WiFi network 120 (e.g., and terminate a RAN connection with RAN 110) when the WiFi latency data and WiFi throughput data are better than the RAN latency data and RAN throughput data. Alternatively, UE 105 may terminate the WiFi connection with WiFi network 120 (e.g., and establish a RAN connection with RAN 110) when the WiFi latency data and WiFi throughput data are not better than the RAN latency data and RAN throughput data.

As further shown in FIG. 1I, and by reference number 190, UE 105 may establish or terminate a RAN connection with RAN 110 based on determining whether the WiFi latency data and WiFi throughput data are better than the RAN latency data and RAN throughput data. For example, UE 105 may establish the RAN connection with RAN 110 (e.g., and terminate a WiFi connection with WiFi network 120) when the WiFi latency data and WiFi throughput data are not better than the RAN latency data and RAN throughput data. Alternatively, UE 105 may terminate the RAN connection with RAN 110 (e.g., and establish a WiFi connection with WiFi network 120) when the WiFi latency data and WiFi throughput data are better than the RAN latency data and RAN throughput data.

In some implementations, if UE 105 is connected to RAN 110, the wireless signal satisfies a threshold SNR and a threshold RSSI, and the WiFi latency data and WiFi throughput data are better than the RAN latency data and the RAN throughput data, UE 105 may terminate a RAN connection with RAN 110 and may establish a WiFi connection with WiFi network 120. Alternatively, if UE 105 is connected to WiFi network 120, the RAN signal satisfies a threshold SNR and a threshold RSRP, and the RAN latency data and the RAN throughput data are better than the WiFi latency data and the WiFi throughput data, UE 105 may terminate a WiFi connection with WiFi network 120 and may establish a RAN connection with RAN 110.

Figure 1J:
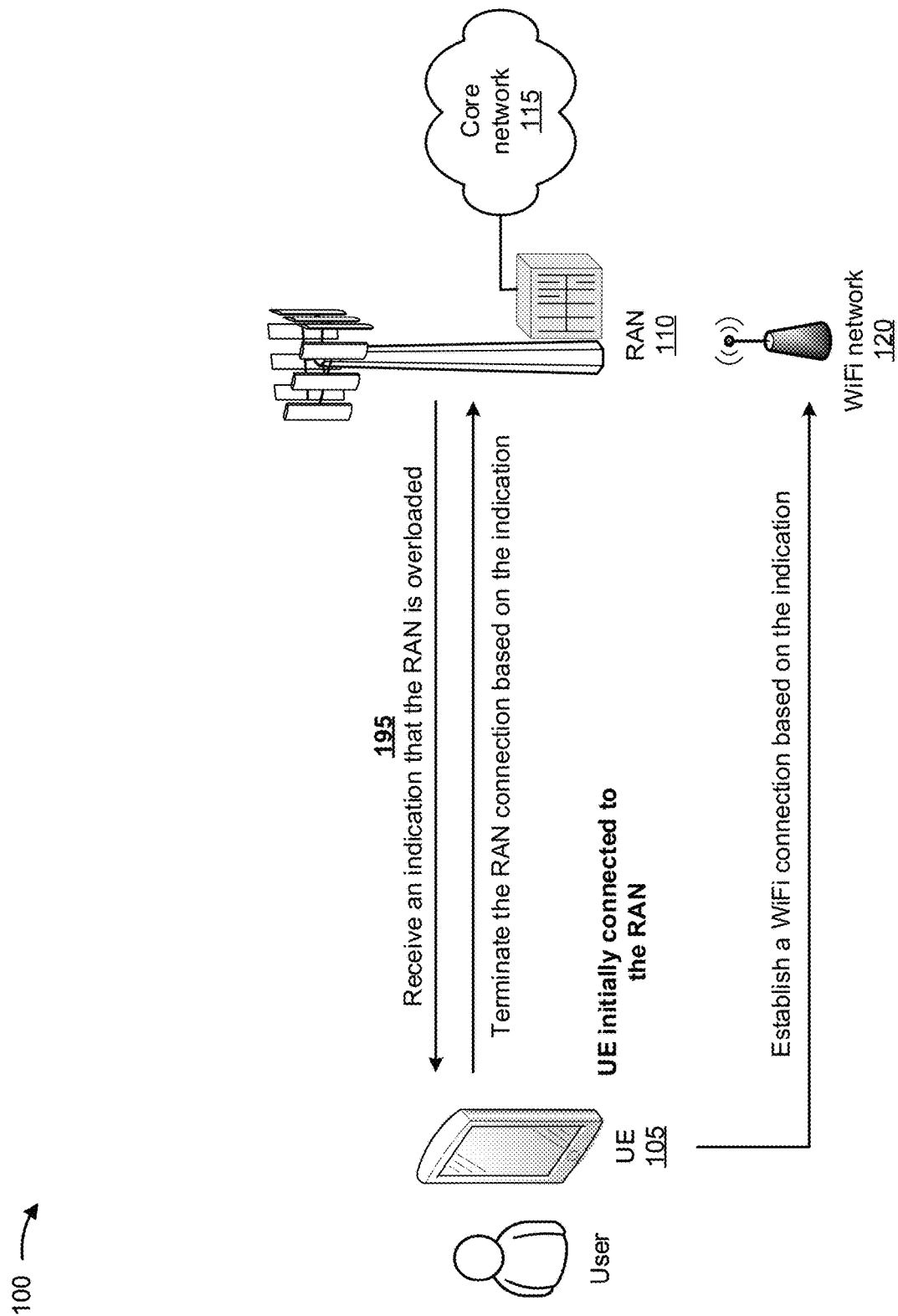

As shown in FIG. 1J, UE 105 may initially be connected to RAN 110 via a RAN connection. As further shown in FIG. 1J, and by reference number 195, UE 105 may receive an indication that RAN 110 is overloaded. In this case, and as further shown in FIG. 1J, UE 105 may terminate the RAN connection with RAN 110 based on the indication that RAN 110 is overloaded, and may establish a WiFi connection with WiFi network 120 based on the indication that RAN 110 is overloaded. In some implementations, RAN 110 may redirect UE 105 to WiFi network 120 by providing, to UE 105, a system information block type2 (SIB2) message with access information that includes redirection data (e.g., a redirection bit) to WiFi network 120. In some implementations, the access information may include a Wi-Fi service set identifier (SSID) that identifies WiFi network 120. In such implementations, UE 105 may connect with WiFi network 120 based on the redirection data.

In this way, UE 105 prioritizes access to 5G ultra-wideband networks (e.g., RAN 110 and core network 115) and wireless networks (e.g., WiFi network 120) based on signal strength, throughput, latency, and/or the like associated with the 5G ultra-wideband networks and the wireless networks. For example, UE 105 may determine signal strengths, throughputs, latencies, and/or the like associated with RAN 110 and WiFi network 120, and may connect to RAN 110 when the signal strength, the throughput, the latency, and/or the like associated with RAN 110 is greater than the signal strength, the throughput, the latency, and/or the like associated with WiFi network 120. In another example, UE 105 may connect to WiFi network 120 when the signal strength, the throughput, the latency, and/or the like associated with WiFi network 120 is greater than the signal strength, the throughput, the latency, and/or the like associated with RAN 110. Thus, UE 105 conserves computing resources, networking resources, and/or the like that would otherwise be inefficiently utilized and wasted by incorrectly routing traffic to Wi-Fi networks, overloading Wi-Fi networks, not enabling discovery and routing of traffic to a 5G ultra-wideband network, and/or the like.

As indicated above, FIGS. 1A-1J are provided merely as examples. Other examples may differ from what is described with regard to FIGS. 1A-1J. The number and arrangement of devices and networks shown in FIGS. 1A-1J are provided as an example. In practice, there may be additional devices and/or networks, fewer devices and/or networks, different devices and/or networks, or differently arranged devices and/or networks than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) of FIGS. 1A-1J may perform one or more functions described as being performed by another set of devices of FIGS. 1A-1J.

Figure 2:
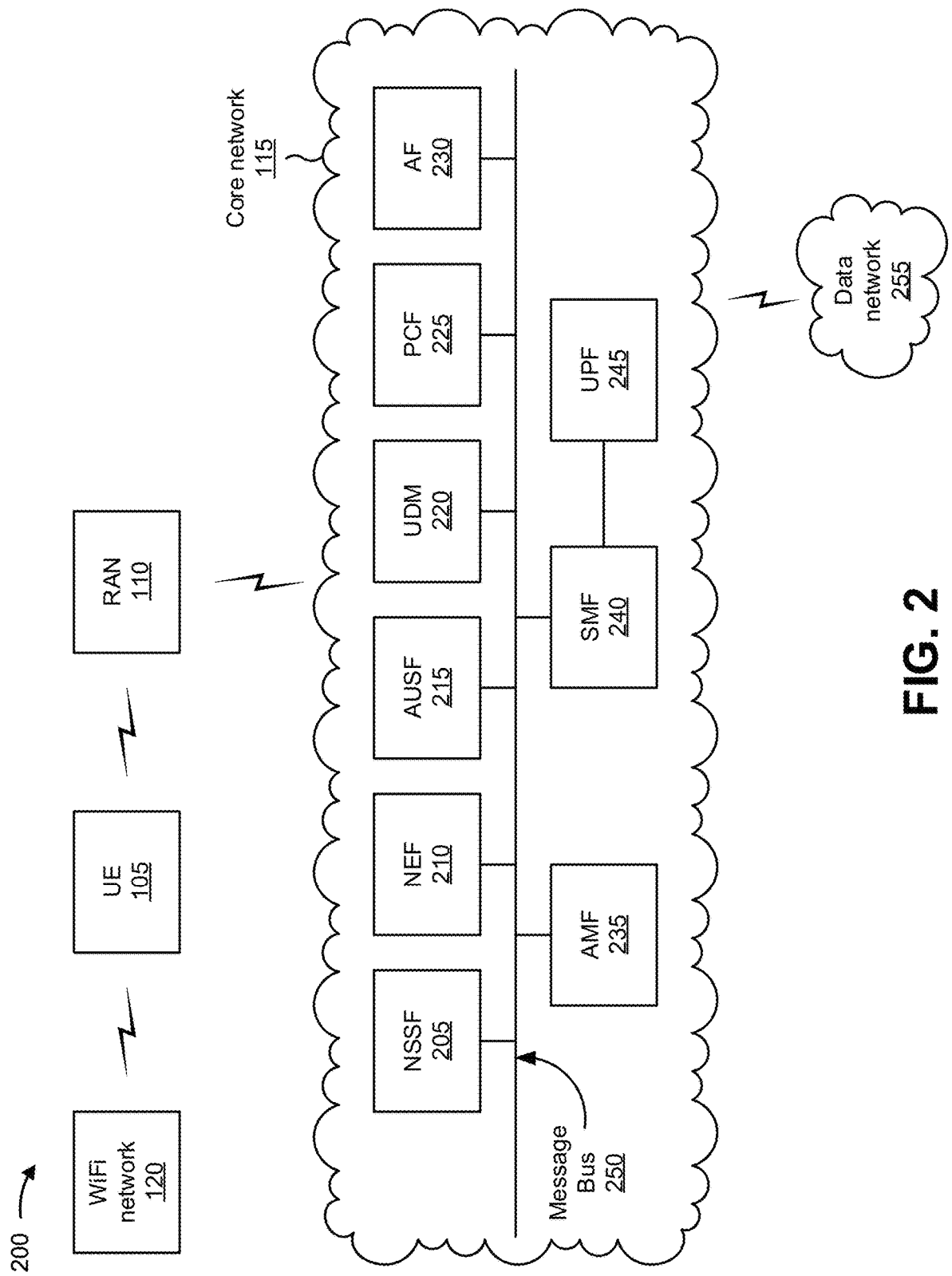
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include user equipment 105, RAN 110, core network 115, WiFi network 120, and a data network 255. Devices and/or networks of example environment 200 may interconnect via wired connections, wireless connections, or a combination of wired and wireless connections.

User equipment 105 includes one or more devices capable of receiving, generating, storing, processing, and/or providing information, such as information described herein. For example, user equipment 105 can include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

RAN 110 may support, for example, a cellular radio access technology (RAT). RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for user equipment 105. RAN 110 may transfer traffic between user equipment 105 (e.g., using a cellular RAT), one or more base stations (e.g., using a wireless interface or a backhaul interface, such as a wired backhaul interface), and/or core network 115. RAN 110 may provide one or more cells that cover geographic areas.

In some implementations, RAN 110 may perform scheduling and/or resource management for user equipment 105 covered by RAN 110 (e.g., user equipment 105 covered by a cell provided by RAN 110). In some implementations, RAN 110 may be controlled or coordinated by a network controller, which may perform load balancing, network-level configuration, and/or the like. The network controller may communicate with RAN 110 via a wireless or wireline backhaul. In some implementations, RAN 110 may include a network controller, a self-organizing network (SON) module or component, or a similar module or component. In other words, RAN 110 may perform network control, scheduling, and/or network management functions (e.g., for uplink, downlink, and/or sidelink communications of user equipment 105 covered by RAN 110).

In some implementations, core network 115 may include an example functional architecture in which systems and/or methods described herein may be implemented. For example, core network 115 may include an example architecture of a fifth generation (5G) next generation (NG) core network included in a 5G wireless telecommunications system. While the example architecture of core network 115 shown in FIG. 2 may be an example of a service-based architecture, in some implementations, core network 115 may be implemented as a reference-point architecture.

As shown in FIG. 2, core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, a user plane function (UPF) 245, and/or the like. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 205 includes one or more devices that select network slice instances for user equipment 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating user equipment 105 in the wireless telecommunications system.

UDM 220 includes one or more devices that store user data and profiles in the wireless telecommunications system. UDM 220 may be used for fixed access, mobile access, and/or the like, in core network 115.

PCF 225 includes one or more devices that provide a policy framework that incorporates network slicing, roaming, packet processing, mobility management, and/or the like.

AF 230 includes one or more devices that support application influence on traffic routing, access to NEF 210, policy control, and/or the like.

AMF 235 includes one or more devices that act as a termination point for non-access stratum (NAS) signaling, mobility management, and/or the like.

SMF 240 includes one or more devices that support the establishment, modification, and release of communication sessions in the wireless telecommunications system. For example, SMF 240 may configure traffic steering policies at UPF 245, enforce user equipment IP address allocation and policies, and/or the like.

UPF 245 includes one or more devices that serve as an anchor point for intraRAT and/or interRAT mobility. UPF 245 may apply rules to packets, such as rules pertaining to packet routing, traffic reporting, handling user plane QoS, and/or the like.

Message bus 250 represents a communication structure for communication among the functional elements. In other words, message bus 250 may permit communication between two or more functional elements.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

WiFi network 120 includes one or more devices on a local area network (LAN) that allows wireless capable devices (e.g., UE 105) and wired networks to connect to the LAN through a wireless standard, such as Wi-Fi, Bluetooth, and/or the like. WiFi network 120 may include a radio transmitter and an antenna, which facilitate connectivity with UE 105 and the Internet or a network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
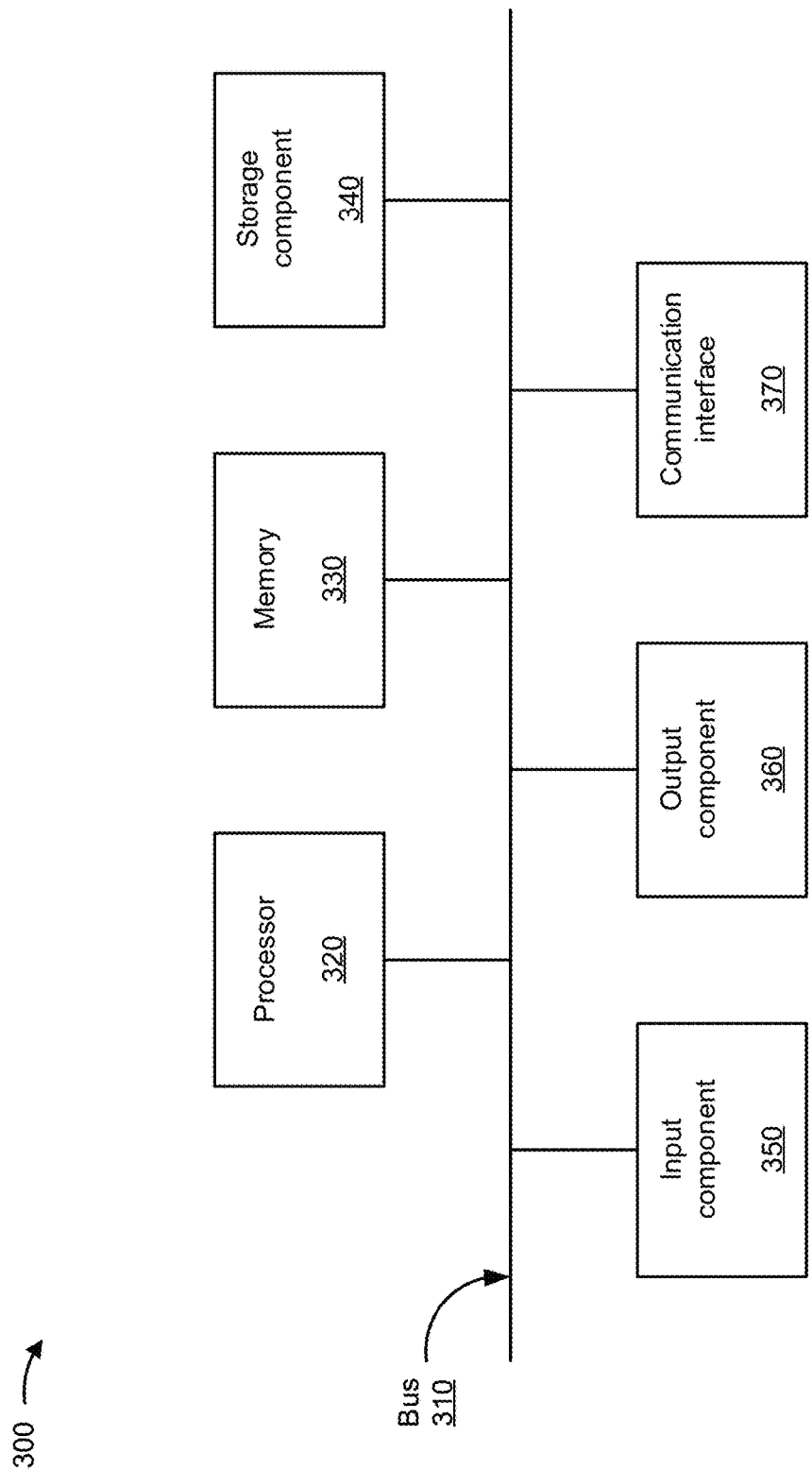
FIG. 3 is a diagram of example components of one or more devices of FIG. 2.

FIG. 3 is a diagram of example components of a device 300. Device 300 may correspond to UE 105, NSSF 205, NEF 210, AUSF 215, UDM 220, PCF 225, AF 230, AMF 235, SMF 240, and/or UPF 245. In some implementations, UE 105, NSSF 205, NEF 210, AUSF 215, UDM 220, PCF 225, AF 230, AMF 235, SMF 240, and/or UPF 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for prioritizing user equipment access to fifth generation networks and wireless networks. In some implementations, one or more process blocks of FIG. 4 may be performed by a device (e.g., UE 105). In some implementations, one or more process blocks of FIG. 4 may be performed by another device or a group of devices separate from or including the device, such as a device of RAN 110 and/or a device of WiFi network 120.

As shown in FIG. 4, process 400 may include establishing a wireless connection with a WiFi network (block 410). For example, the device (e.g., using processor 320, memory 330, communication interface 370, and/or the like) may establish a wireless connection with a WiFi network, as described above.

As further shown in FIG. 4, process 400 may include performing a measurement associated with a fifth generation (5G) ultra-wideband radio access network (block 420). For example, the device (e.g., using processor 320, storage component 340, communication interface 370, and/or the like) may perform a measurement associated with a 5G ultra-wideband radio access network, as described above.

As further shown in FIG. 4, process 400 may include determining whether the measurement satisfies a signal strength threshold (block 430). For example, the device (e.g., using processor 320, memory 330, and/or the like) may determine whether the measurement satisfies a signal strength threshold, as described above.

As further shown in FIG. 4, process 400 may include selectively performing, by the device, a first action a first action that includes providing an indication of an availability of the 5G ultra-wideband radio access network, for display, when the measurement satisfies the signal strength threshold, or a second action that includes maintaining the wireless connection when the measurement fails to satisfy the signal strength threshold (block 440). For example, the device (e.g., using processor 320, memory 330, storage component 340, communication interface 370, and/or the like) may selectively perform a first action or a second action based on whether the measurement satisfies the signal strength threshold, as described above. In some implementations, the first action may include providing an indication of an availability of the 5G ultra-wideband radio access network, for display, when the measurement satisfies the signal strength threshold, and the second action may include maintaining the wireless connection when the measurement fails to satisfy the signal strength threshold.

In some implementations, when the first action is performed, process 400 may include receiving a selection of the indication, terminating the wireless connection based on receiving the selection of the indication, and establishing a connection with the 5G ultra-wideband radio access network based on receiving the selection of the indication. In some implementations, when the second action is performed, process 400 may include periodically receiving measurements associated with the 5G ultra-wideband radio access network.

In some implementations, when the first action is performed, process 400 may include receiving a selection of the indication; terminating the wireless connection based on receiving the selection of the indication; establishing a connection with the 5G ultra-wideband radio access network based on receiving the selection of the indication; receiving data identifying an overload condition for the 5G ultra-wideband radio access network after establishing the connection with the 5G ultra-wideband radio access network; terminating the connection with the 5G ultra-wideband radio access network based on receiving the data identifying the overload condition for the 5G ultra-wideband radio access network; and reestablishing the wireless connection with the WiFi network based on receiving the data identifying the overload condition for the 5G ultra-wideband radio access network.

Process 400 may include additional implementations, such as any single implementation or any combination of implementations described below and/or in connection with one or more other processes described elsewhere herein.

In some implementations, process 400 may include receiving another measurement associated with the 5G ultra-wideband radio access network after establishing the connection with the 5G ultra-wideband radio access network; determining that the other measurement fails to satisfy the signal strength threshold; terminating the connection with the 5G ultra-wideband radio access network based on determining that the other measurement fails to satisfy the signal strength threshold; and reestablishing the wireless connection with the WiFi network based on determining that the other measurement fails to satisfy the signal strength threshold.

In some implementations, process 400 may include receiving first throughput data associated with the WiFi network; receiving second throughput data associated with the 5G ultra-wideband radio access network; determining whether the first throughput data is greater than or equal to the second throughput data; and maintaining the wireless connection when the first throughput data is greater than or equal to the second throughput data.

In some implementations, process 400 may include providing the indication of the availability of the 5G ultra-wideband radio access network, for display, when the first throughput data is less than the second throughput data; receiving a selection of the indication; terminating the wireless connection based on receiving the selection of the indication; and establishing a connection with the 5G ultra-wideband radio access network based on receiving the selection of the indication.

In some implementations, process 400 may include generating a request for a particular service provided by the 5G ultra-wideband radio access network, terminating the wireless connection based on generating the request for the particular service, and establishing a connection with the 5G ultra-wideband radio access network based on receiving the selection of the indication. The particular service may include at least one of an augmented reality service, a virtual reality service, or a video upload service. In some implementations, process 400 may include establishing the connection with the 5G ultra-wideband radio access network via an access point name.

In some implementations, process 400 may include receiving first latency data associated with the WiFi network; receiving second latency data associated with the 5G ultra-wideband radio access network; determining whether the first latency data is less than or equal to the second latency data; and maintaining the wireless connection when the first latency data is less than or equal to the second latency data.

In some implementations, process 400 may include providing the indication of the availability of the 5G ultra-wideband radio access network, for display, when the first latency data is greater than the second latency data; receiving a selection of the indication; terminating the wireless connection based on receiving the selection of the indication; and establishing a connection with the 5G ultra-wideband radio access network based on receiving the selection of the indication.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    establishing, by a device, a wireless connection with a WiFi network;
    performing, by the device and while maintaining the wireless connection with the WiFi network, a measurement associated with a fifth generation (5G) ultra-wideband radio access network,
        wherein the measurement is a radio access network measurement, and
        wherein performing the measurement includes establishing a preliminary connection with the 5G ultra-wideband radio access network,
            wherein the preliminary connection is usable for data transmission using the 5G ultra-wideband radio access network rather than the wireless connection;
    determining, by the device, whether the measurement satisfies a signal strength threshold to determine that the 5G ultra-wideband radio access network is available to the device; and
    selectively performing, by the device, a first action or a second action based on whether the measurement satisfies the signal strength threshold,
        wherein the first action includes maintaining access to the 5G ultra-wideband radio access network and providing an indication of an availability of the 5G ultra-wideband radio access network, for display, when the measurement satisfies the signal strength threshold, and
        wherein the second action includes terminating access to the 5G ultra-wideband radio access network and maintaining the wireless connection when the measurement fails to satisfy the signal strength threshold.

2. The method of claim 1, wherein, when the first action is performed, the method further comprises:
    receiving a selection of the indication;
    terminating the wireless connection based on receiving the selection of the indication; and establishing a connection with the 5G ultra-wideband radio access network based on receiving the selection of the indication.

3. The method of claim 2, further comprising:
performing another measurement associated with the 5G ultra-wideband radio access network after establishing the connection with the 5G ultra-wideband radio access network;
determining that the other measurement fails to satisfy the signal strength threshold;
terminating the connection with the 5G ultra-wideband radio access network based on determining that the other measurement fails to satisfy the signal strength threshold; and
reestablishing the wireless connection with the WiFi network based on determining that the other measurement fails to satisfy the signal strength threshold.

4. The method of claim 1, wherein, when the second action is performed, the method further comprises:
periodically connecting to the 5G ultra-wideband radio access network; and
performing measurements associated with the 5G ultra-wideband radio access network based on periodically connecting to the 5G ultra-wide radio access network.

5. The method of claim 1, further comprising:
receiving first throughput data associated with the WiFi network;
receiving second throughput data associated with the 5G ultra-wideband radio access network;
determining whether the first throughput data is greater than or equal to the second throughput data; and
maintaining the wireless connection when the first throughput data is greater than or equal to the second throughput data.

6. The method of claim 5, further comprising:
providing the indication of the availability of the 5G ultra-wideband radio access network, for display, when the first throughput data is less than the second throughput data;
receiving a selection of the indication;
terminating the wireless connection based on receiving the selection of the indication; and
establishing a connection with the 5G ultra-wideband radio access network based on receiving the selection of the indication.

7. The method of claim 1, wherein, when the first action is performed, the method further comprises:
receiving a selection of the indication;
terminating the wireless connection based on receiving the selection of the indication;
establishing a connection with the 5G ultra-wideband radio access network based on receiving the selection of the indication;
receiving data identifying an overload condition for the 5G ultra-wideband radio access network after establishing the connection with the 5G ultra-wideband radio access network;
terminating the connection with the 5G ultra-wideband radio access network based on receiving the data identifying the overload condition for the 5G ultra-wideband radio access network; and
reestablishing the wireless connection with the WiFi network based on receiving the data identifying the overload condition for the 5G ultra-wideband radio access network.

8. A device, comprising:
one or more processors configured to:
establish a wireless connection with a WiFi network;
perform, while maintaining the wireless connection with the WiFi network, a measurement associated with a fifth generation (5G) ultra-wideband radio access network,
wherein the measurement is a radio access network measurement, and
wherein the one or more processors, when performing the measurement, are configured to establish a preliminary connection with the 5G ultra-wideband radio access network,
wherein the preliminary connection is usable for data transmission using the 5G ultra-wideband radio access network rather than the wireless connection;
determine whether the measurement satisfies a signal strength threshold to determine that the 5G ultra-wideband radio access network is available to the device; and
selectively perform a first action when the measurement satisfies the signal strength threshold, or a second action when the measurement fails to satisfy the signal strength threshold,
wherein the first action includes:
providing an indication of an availability of the 5G ultra-wideband radio access network for display,
receiving a selection of the indication,
terminating the wireless connection based on receiving the selection of the indication, and
establishing a connection with the 5G ultra-wideband radio access network based on receiving the selection of the indication, and
wherein the second action includes terminating access to the 5G ultra-wideband radio access network and maintaining the wireless connection.

9. The device of claim 8, wherein, when the first action is performed, the one or more processors are further configured to:
receive data identifying an overload condition for the 5G ultra-wideband radio access network after establishing the connection with the 5G ultra-wideband radio access network;
terminate the connection with the 5G ultra-wideband radio access network based on receiving the data identifying the overload condition for the 5G ultra-wideband radio access network; and
reestablish the wireless connection with the WiFi network based on receiving the data identifying the overload condition for the 5G ultra-wideband radio access network.

10. The device of claim 8, wherein the one or more processors are further configured to:
generate a request for a particular service provided by the 5G ultra-wideband radio access network;
terminate the wireless connection based on generating the request for the particular service; and
establish a connection with the 5G ultra-wideband radio access network based on receiving the selection of the indication.

11. The device of claim 10, wherein the particular service includes at least one of:
an augmented reality service,
a virtual reality service,
a mixed reality service, or
a video service.

12. The device of claim 10, wherein the one or more processors, when establishing the connection with the 5G ultra-wideband radio access network, are configured to:
establish the connection with the 5G ultra-wideband radio access network via an access point name.

13. The device of claim 8, wherein the one or more processors are further configured to:
receive first latency data associated with the WiFi network;
receive second latency data associated with the 5G ultra-wideband radio access network;
determine whether the first latency data is less than or equal to the second latency data; and
maintain the wireless connection when the first latency data is less than or equal to the second latency data.

14. The device of claim 13, wherein the one or more processors are further configured to:
provide the indication of the availability of the 5G ultra-wideband radio access network, for display, when the first latency data is greater than the second latency data;
receive a selection of the indication;
terminate the wireless connection based on receiving the selection of the indication; and
establish a connection with the 5G ultra-wideband radio access network based on receiving the selection of the indication.

15. A non-transitory computer-readable medium storing instructions, the instructions comprising:
one or more instructions that, when executed by one or more processors, cause the one or more processors to:
perform, while maintaining a preliminary wireless connection with a WiFi network, a measurement associated with a fifth generation (5G) ultra-wideband radio access network,
wherein the measurement is a radio access network measurement, and
wherein the one or more instructions, that cause the one or more processors to perform the measurement cause the one or more processors to establish a preliminary connection with the 5G ultra-wideband radio access network,
wherein the preliminary connection is usable for data transmission using the 5G ultra-wideband radio access network rather than the wireless connection;
determine whether the measurement satisfies a signal strength threshold to determine that the 5G ultra-wideband radio access network is available;
provide an indication of an availability of the 5G ultra-wideband radio access network, for display, when the measurement satisfies the signal strength threshold;
determine whether a selection of the indication is received;
establish a connection with the 5G ultra-wideband radio access network when the selection of the indication is received; and
establish a wireless connection with the WiFi network and terminate access to the 5G ultra-wideband radio access network and when the measurement fails to satisfy the signal strength threshold and when the selection of the indication is not received.

16. The non-transitory computer-readable medium of claim 15, wherein the instructions further comprise:
one or more instructions that, when executed by the one or more processors, cause the one or more processors to:
perform another measurement associated with the 5G ultra-wideband radio access network after establishing the connection with the 5G ultra-wideband radio access network;
determine that the other measurement fails to satisfy the signal strength threshold;
terminate the connection with the 5G ultra-wideband radio access network based on determining that the other measurement fails to satisfy the signal strength threshold; and
establish the wireless connection with the WiFi network based on determining that the other measurement fails to satisfy the signal strength threshold.

17. The non-transitory computer-readable medium of claim 15, wherein the instructions further comprise:
one or more instructions that, when executed by the one or more processors, cause the one or more processors to:
receive first throughput data associated with the WiFi network;
receive second throughput data associated with the 5G ultra-wideband radio access network;
determine whether the first throughput data is greater than or equal to the second throughput data; and
establish the wireless connection when the first throughput data is greater than or equal to the second throughput data.

18. The non-transitory computer-readable medium of claim 17, wherein the instructions further comprise:
one or more instructions that, when executed by the one or more processors, cause the one or more processors to:
provide the indication of the availability of the 5G ultra-wideband radio access network, for display, when the first throughput data is less than the second throughput data;
receive the selection of the indication; and
establish the connection with the 5G ultra-wideband radio access network based on receiving the selection of the indication.

19. The non-transitory computer-readable medium of claim 15, wherein the instructions further comprise:
one or more instructions that, when executed by the one or more processors, cause the one or more processors to:
receive data identifying an overload condition for the 5G ultra-wideband radio access network after establishing the connection with the 5G ultra-wideband radio access network;
terminate the connection with the 5G ultra-wideband radio access network based on receiving the data identifying the overload condition for the 5G ultra-wideband radio access network; and
establish the wireless connection with the WiFi network based on receiving the data identifying the overload condition for the 5G ultra-wideband radio access network.

20. The non-transitory computer-readable medium of claim 15, wherein the instructions further comprise:
one or more instructions that, when executed by the one or more processors, cause the one or more processors to:
generate a request for a particular service provided by the 5G ultra-wideband radio access network; and establish the connection with the 5G ultra-wideband radio access network based on receiving the selection of the indication.

\* \* \* \* \*